United States Patent
Lee et al.

(10) Patent No.: US 9,262,993 B2
(45) Date of Patent: Feb. 16, 2016

(54) DISPLAY PANEL DRIVER, METHOD OF DRIVING DISPLAY PANEL USING THE SAME AND DISPLAY APPARATUS HAVING THE SAME

(71) Applicant: Samsung Display Co., Ltd., Yongin, Gyeonggi-Do (KR)

(72) Inventors: Joo-Hyung Lee, Yongin (KR); Hee-Chul Hwang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 175 days.

(21) Appl. No.: 13/953,573

(22) Filed: Jul. 29, 2013

(65) Prior Publication Data

US 2014/0198028 A1 Jul. 17, 2014

(30) Foreign Application Priority Data

Jan. 16, 2013 (KR) .................. 10-2013-0004750

(51) Int. Cl.
*G09G 3/20* (2006.01)
*G09G 5/10* (2006.01)
*G06F 3/01* (2006.01)
*G06F 1/16* (2006.01)

(52) U.S. Cl.
CPC ............... *G09G 5/10* (2013.01); *G06F 1/1613* (2013.01); *G06F 3/013* (2013.01); *G09G 3/2044* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 2005/0140583 A1* | 6/2005 | Myoung | G09G 3/2022 345/60 |
| 2005/0225565 A1 | 10/2005 | Seong et al. | |
| 2006/0152444 A1* | 7/2006 | Park | 345/63 |
| 2009/0307631 A1* | 12/2009 | Kim et al. | 715/830 |
| 2014/0049462 A1* | 2/2014 | Weinberger et al. | 345/156 |
| 2014/0139540 A1* | 5/2014 | Govil | G09G 5/10 345/589 |

FOREIGN PATENT DOCUMENTS

| | | |
|---|---|---|
| KR | 10-2005-0099303 A | 10/2005 |
| KR | 10-0522706 B1 | 10/2005 |
| KR | 10-2007-0105575 A | 10/2007 |

* cited by examiner

*Primary Examiner* — Gerald Johnson
*Assistant Examiner* — Christopher Kohlman
(74) *Attorney, Agent, or Firm* — Lewis Roca Rothgerber Christie LLP (57) ABSTRACT

A display panel driver including a moving image determining part, a sensing part and a dithering part. The moving image determining part determines whether an input image data represents a moving image or a static image. The sensing part senses a movement of a display apparatus or a user of the display apparatus. The dithering part performs a dithering operation to the input image data when the input image data represents the moving image or when at least one of the display apparatus and the user moves when the input image data represents the static image.

19 Claims, 4 Drawing Sheets

DISPLAY PANEL DRIVER, METHOD OF DRIVING DISPLAY PANEL USING THE SAME AND DISPLAY APPARATUS HAVING THE SAME

CROSS-REFERENCE TO RELATED APPLICATION

This application claims priority to and the benefit of Korean Patent Application No. 10-2013-0004750, filed Jan. 16, 2013 in the Korean Intellectual Property Office KIPO, the entire disclosure of which is incorporated herein by reference.

BACKGROUND

1. Field

Embodiments of the present disclosure relate to a display apparatus. In particular, example embodiments of the present disclosure relate to a display panel driver, a method of driving a display panel using the display panel driver and a display apparatus having the display panel driver.

2. Description of the Related Art

A display apparatus may include a display panel and a display panel driver. The display panel may include a plurality of gate lines, a plurality of data lines and a plurality of pixels. The display panel driver may include a controller, a gate driver and a data driver.

The controller may receive input image data and the controller may compensate the input image data to generate output image data. The controller may also apply a dithering operation to the input image data.

However, when the dithering operation is applied to the input image data representing a static image, a dithering noise may be generated such that a display quality of the display panel may deteriorate. Additionally, when the display apparatus is shaken or a user holding the display apparatus moves, the display quality of the display panel may also deteriorate.

SUMMARY

Aspects of the embodiments of the present disclosure are directed toward a display panel driver for improving a display quality of a display panel.

Aspects of the embodiments of the present disclosure are also directed toward a method for driving the display panel using the display panel driver.

Aspects of the embodiments of the present disclosure also provide a display apparatus including the display panel driver.

In an embodiment of a display panel driver according to the disclosure, the display panel driver may include a moving image determining part configured to determine whether an input image data represents a moving image or a static image, a sensing part configured to sense a movement of a display apparatus or a user of the display apparatus, and a dithering part configured to perform a dithering operation to the input image data when: the input image data represents the moving image, or the input image data represents the static image and the movement of the display apparatus or the user is sensed.

The display panel driver may further include a memory configured to store the input image data, wherein the moving image determining part is configured to analyze the input image data stored in the memory, and wherein the moving image determining part is configured to analyze a command signal to access the memory to determine whether the input image data represents the moving image or the static image.

The display panel driver may include a sensor configured to sense the movement of the display apparatus.

The sensor may be an acceleration sensor.

The sensing part may include a sensor configured to sense the movement of the user.

The sensor may be an infrared sensor configured to sense positions of eyeballs of the user.

The sensing part may be configured to sense a relative movement between the display apparatus and the user, and wherein the sensing part may include a first sensor configured to sense the movement of the display apparatus and a second sensor configured to sense the movement of the user.

The dithering part may include a first dithering part configured to perform a first dithering operation to the input image data when the input image data represents the moving image, and a second dithering part configured to perform a second dithering operation to the input image data when the input image data represents the static image and the display apparatus or the user moves.

The first dithering operation may be different from the second dithering operation, a dithering degree of the first dithering operation may be determined according to a movement of an object in the moving image, and a dithering degree of the second dithering operation may be determined according to the movement of the display apparatus or the user.

The display panel driver may further include an error diffusing part configured to diffuse quantization error of the dithered input image data to adjacent pixels.

The display panel driver may further include a pattern control part, wherein the pattern control part may be configured to control output image data to have X subframes when the dithering operation is applied to the input image data, X being a positive integer, and the pattern control part may be configured to control the output image data to have Y subframes when the dithering operation is not applied to the input image data, Y being a positive integer different from X.

X may be greater than Y.

In an embodiment according to the disclosure, a method of driving a display panel may include determining whether input image data represents a moving image or a static image, sensing a movement of a display apparatus or a user of the display apparatus, and performing a dithering operation to the input image data when: the input image data represents the moving image, or when the input image data represents the static image and the movement of the display apparatus or the user is sensed.

The method may further include storing the input image data to a memory, wherein the determining whether input image data represents the moving image or the static image includes analyzing the input image data inputted to the memory, and analyzing a command signal to access the memory.

The sensing the movement of the display apparatus or the user may include sensing the movement of the display apparatus by a sensor.

The sensor may include an acceleration sensor.

The sensing the movement of the display apparatus or the user may include sensing the movement of the user by a sensor.

The sensor may include an infrared sensor adapted to sense positions of eyeballs of the user.

The sensing the movement of the display apparatus or the user of the display apparatus may include determining a relative movement between the display apparatus and the user using a first sensor sensing the movement of the display apparatus or a second sensor sensing the movement of the user.

A display apparatus may include a display panel including a gate line and a data line, a controller including a moving image determining part configured to determine whether an input image data represents a moving image or a static image, a sensing part configured to sense a movement of a display apparatus or a user of the display apparatus, and a dithering part configured to perform a dithering operation to the input image data when: the input image data represents the moving image, or the input image data represents the static image and the movement of the display apparatus or the user is sensed, the controller may be configured to generate a first control signal, a second control signal and a data signal, a gate driver may be configured to output a gate signal to drive the gate line based on the first control signal received from the controller, and a data driver configured to output a data voltage to drive the data line based on the second control signal and the data signal received from the controller.

BRIEF DESCRIPTION OF THE DRAWINGS

The features and aspects of various embodiments of the present disclosure will be described as detailed example embodiments thereof with reference to the accompanying drawings.

DETAILED DESCRIPTION

Hereinafter, the embodiments of the present disclosure will be explained in detail with reference to the accompanying drawings.

Figure 1:
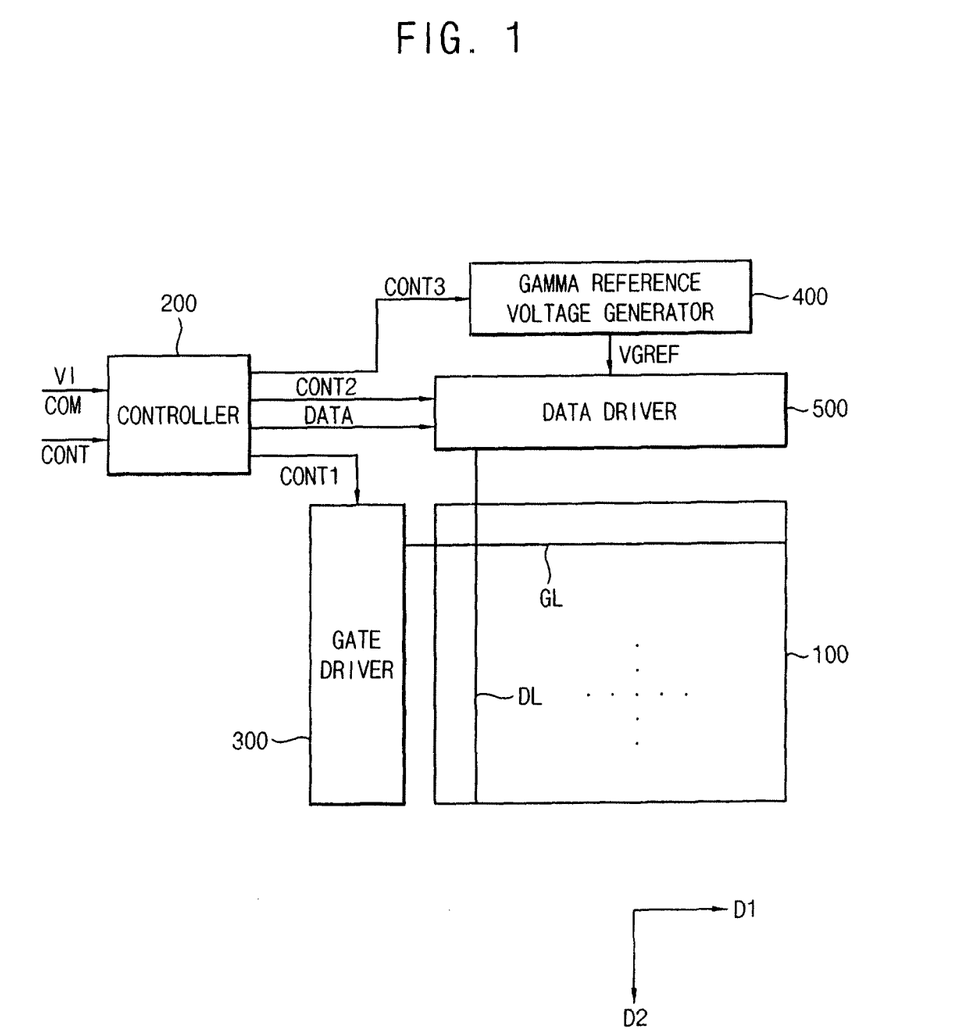
FIG. 1 is a block diagram illustrating a display apparatus according to an embodiment of the present disclosure.

FIG. 1 is a block diagram illustrating a display apparatus according to an embodiment of the present disclosure.

Referring to FIG. 1, the display apparatus includes a display panel 100 and a display panel driver. The display panel driver includes a controller 200, a gate driver 300, a gamma reference voltage generator 400 and a data driver 500. For example, the display apparatus may be an organic light emitting display apparatus. According to some embodiments, the display apparatus may be, but not limited to, a liquid crystal display apparatus, or a plasma display panel display apparatus.

The display panel 100 includes a plurality of gate lines GL and a plurality of data lines DL. The display panel 100 also includes a plurality of unit pixels connected to the gate lines GL and the data lines DL. The gate lines GL extend in a first direction D1 and the data lines DL extend in a second direction D2 crossing the first direction D1. The unit pixels may be arranged in a matrix form.

According to an embodiment of the present disclosure, the controller 200 receives input image data VI, a command signal COM and an input control signal CONT from an external apparatus. The input image data may include red image data, green image data and blue image data. The command signal COM is a signal to access the memory to writing or reading the input image data VI. The input control signal CONT may include a master clock signal and a data enable signal. The input control signal CONT may include a vertical synchronizing signal and a horizontal synchronizing signal.

The controller 200 generates a first control signal CONT1, a second control signal CONT2, a third control signal CONT3 and a data signal DATA based on the input image data VI, the command signal COM and the input control signal CONT.

The controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The controller 200 generates the data signal DATA based on the input image data VI and outputs the data signal DATA to the data driver 500. The data processing operation of the controller 200 will be explained in more detail with reference to FIG. 2.

The controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the controller 200. The gate driver 300 sequentially outputs the gate signals to the gate lines GL.

In some embodiments, the gate driver 300 may be mounted directly on the display panel 100, or may be connected to the display panel 100 as a tape carrier package ("TCP"). In some embodiments, the gate driver 300 may be integrated on the display panel 100.

The gamma reference voltage generator 400 generates a gamma reference voltage VGREF in response to the third control signal CONT3 received from the controller 200. The gamma reference voltage generator 400 provides the gamma reference voltage VGREF to the data driver 500. The gamma reference voltage VGREF has a value corresponding to a level of the data signal DATA.

In some embodiments, the gamma reference voltage generator 400 may be located in the controller 200, or in the data driver 500.

The data driver 500 receives the second control signal CONT2 and the data signal DATA from the controller 200, and receives the gamma reference voltages VGREF from the gamma reference voltage generator 400. The data driver 500 converts the data signal DATA into analog data voltages by using the gamma reference voltages VGREF. The data driver 500 outputs the analog data voltages to the data lines DL.

In some embodiments, the data driver 500 may include a shift register, a latch, a signal processing part and a buffer part. The shift register outputs a latch pulse to the latch. The latch temporally stores the data signal DATA, and outputs the data signal DATA to the signal processing part. The signal processing part generates an analog data voltage based on the digital data signal and the gamma reference voltage VGREF. The signal processing part outputs the data voltage to the buffer part. The buffer part compensates the data voltage to have a uniform level. The buffer part outputs the compensated data voltage to the data line DL.

In some embodiments, the data driver 500 is directly mounted on the display panel 100, or is connected to the display panel 100 as a TCP. According to another embodiment, the data driver 500 is integrated on the display panel 100.

Figure 2:
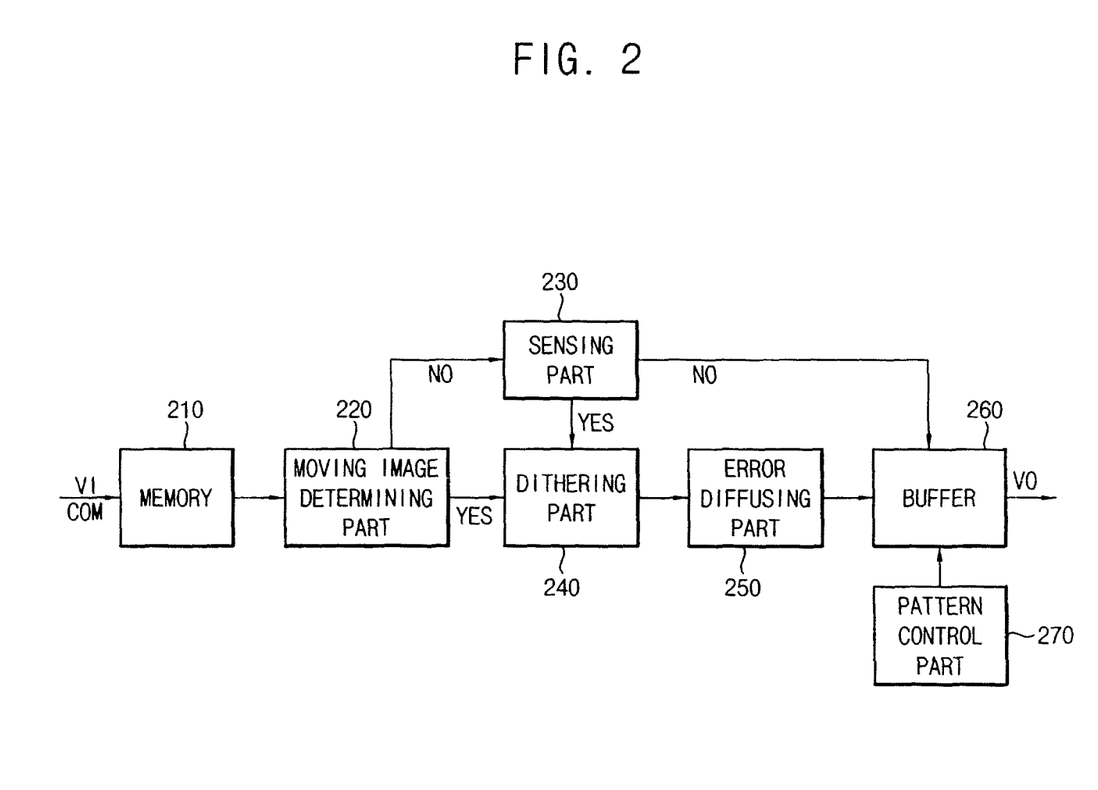
FIG. 2 is a block diagram illustrating the controller of FIG. 1.

FIG. 2 is a block diagram illustrating the controller 200 of FIG. 1.

Referring to FIGS. 1 and 2, the controller 200 includes a memory 210, a moving image determining part 220, a sensing part 230, a dithering part 240, an error diffusing part 250, a buffer 260, and a pattern control part 270.

According to an embodiment of the present disclosure, the memory 210 stores the input image data VI according to the command signal COM. For example, the memory 210 may be a random access memory ("RAM").

According to an embodiment of the present disclosure, the moving image determining part 220 determines whether the input image data VI represent a moving image or a static image. The moving image determining part 220 may analyze the input image data VI inputted to the memory 210 and the command signal to access the memory 210 to determine whether the input image data VI represents a moving image or a static image.

According to an embodiment of the present disclosure, the sensing part 230 senses a movement of the display apparatus and/or a movement of the user.

For example, the sensing part 230 may include a first sensor such as an accelerator for sensing the movement of the display apparatus.

In one embodiment, the sensing part 230 includes a second sensor such as an infrared sensor for sensing the movement of the user. For example, the second sensor may sense positions of eyeballs of the user.

According to an embodiment of the present disclosure, the sensing part 230 includes both the first sensor for sensing the movement of the display apparatus, and the second sensor for sensing the movement of the user. The sensing part 230 may sense a relative movement between the display apparatus and the user.

Thus, for example, when the user does not move but the display apparatus moves, the sensing part 230 may sense the relative movement between the display apparatus and the user. When the display apparatus does not move but the user moves, the sensing part 230 may also sense the relative movement between the display apparatus and the user. Furthermore, when the display apparatus and the user move, respectively, in different directions, the sensing part 230 may sense the relative movement between the display apparatus and the user. Contrarily, when the display apparatus and the user move in the same direction and with the same velocity, the sensing part 230 may not sense the relative movement between the display apparatus and the user.

According to an embodiment of the present disclosure, the dithering part 240 operates a dithering operation to the input image data VI. When the dithering operation is applied to a moving image, a movement in the moving image becomes smoother so that a display quality of the display panel 100 is improved. In contrast, when the dithering operation is applied to a static image, a dithering noise may be generated such that the display quality of the display panel 100 may deteriorate. Thus, the dithering operation to the input image data VI is performed by the dither part 240 when the input image data VI represents a moving image.

Although the input image data VI represents a static image, when the display apparatus or the user moves, the dithering operation may be applied to the input image data VI as if the input image data VI represented a moving image. Thus, the display quality of the display panel 100 may be improved. Therefore, although the input image data VI represent a static image, when the display apparatus or the user moves, the dithering part 240 may operate the dithering operation to the input image data VI according to the embodiments of the present disclosure.

In some embodiments, when the input image data VI represents a static image and the movement of the display apparatus or the user is not sensed, the dithering operation may not be applied to the input image data VI.

According to an embodiment of the present disclosure, the error diffusing part 250 receives the dithered image data. The error diffusing part 250 diffuses an error due to quantization of the dithered image data to adjacent pixels so that the display quality of the display panel 100 may be further improved. In some embodiments, the error diffusing part 250 may be omitted.

When the dithering operation is applied to the input image data VI, the buffer 260 receives the error-diffused image data from the error diffusing part 250. When the dithering operation is not applied to the input image data VI, the buffer 260 receives the input image data VI from the memory 210. The buffer 260 outputs output image data VO.

By way of example and not of limitation, the buffer 260 may be a frame buffer or a line buffer.

According to an embodiment of the present disclosure, the pattern control part 270 determines a pattern of a signal and the number of subframes according to the dithering operation. When the dithering operation is applied to the input image data VI, the pattern control part 270 controls the output image data VO to have X subframes. Herein the present disclosure, X is defined to be a positive integer. In contrast, when the dithering operation is not applied to the input image data VI, the pattern control part 270 controls the output image data VO to have Y subframes. Herein the present disclosure, Y is defined to be a positive integer, where X is greater than Y.

When the dithering operation is applied to the input image data VI, the pattern control part 270 generates a signal pattern appropriate for the dithered image, and the pattern control part 270 controls the output image data VO to have relatively more subframes. When the dithering operation is applied to the input image data VI, the pattern control part 270 generates a signal pattern appropriate for the input image data VI, and the pattern control part 270 controls the output image data VO to have relatively fewer subframes.

Thus, the pattern control part 270 controls the input image data VI to have fewer subframes in order to decrease power consumption.

In some embodiments, the controller 200 further includes an image compensating part for compensating the output image data VO. For example, the image compensating part may include an adaptive color correction part and a dynamic capacitance compensation part.

In some embodiments, the adaptive color correction part receives the output image data VO and operates the adaptive color correction. The adaptive color correction part may compensate grayscale data of the output image data VO using a gamma curve.

In some embodiments, the dynamic capacitance compensation part operates dynamic capacitance compensation for compensating grayscale data of present frame data of the output image data VO using previous frame data and the present frame data of the output image data VO.

In some embodiments, the controller 200 further includes a signal generating part. The signal generating part receives the input control signal CONT. The signal generating part generates the first control signal CONT1 for controlling a driving timing of the gate driver 300, the second control signal CONT2 for controlling a driving timing of the data driver 500 and the third control signal CONT3 for controlling a driving timing of the gamma reference voltage generator 400.

The signal generating part outputs the first control signal CONT1 to the gate driver 300, the second control signal CONT2 to the data driver 500 and the third control signal CONT3 to the gamma reference voltage generator 400.

According to an embodiment of the present disclosure, when the input image data VI represents a moving image, the dithering operation is applied to the input image data VI. When the input image data VI represents a static image and the movement of the display apparatus or the user is sensed, the dithering operation is also applied to the input image data VI. Thus, a display quality of the display panel 100 may be improved.

In addition, the number of the subframes of the output image data VO is controlled according to the dithering operation so that power consumption of the display apparatus may be decreased.

Figure 3:
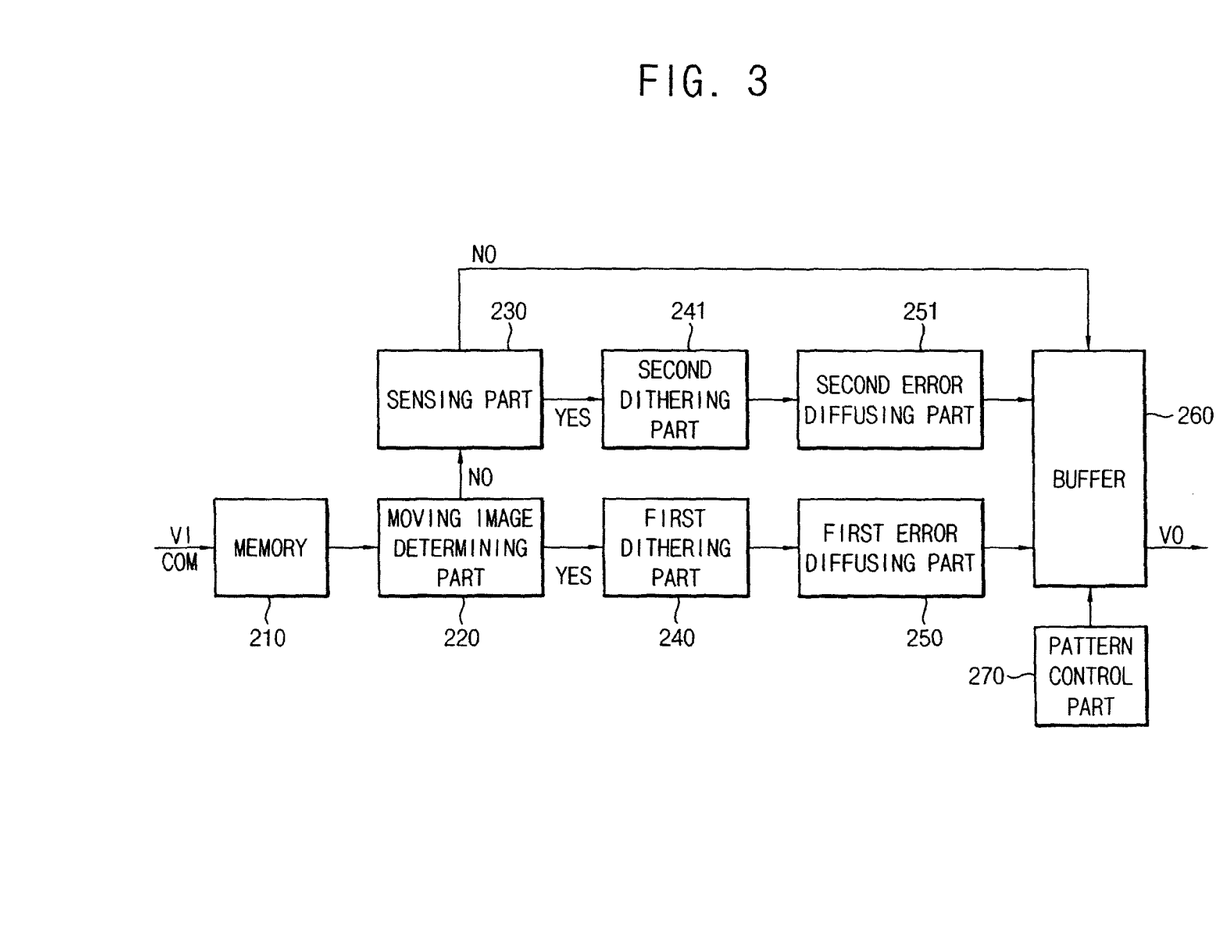
FIG. 3 is a block diagram illustrating the controller of the display apparatus according to an embodiment of the present disclosure.

FIG. 3 is a block diagram illustrating a controller of a display apparatus according to an embodiment of the present disclosure.

The display apparatus that will be described according to the embodiments shown in FIG. 3 is substantially similar to the display apparatus of the embodiments described with reference to FIGS. 1 and 2 except for the controller. Thus, the same reference numerals will be used to refer to the same or like parts as those described in the previous example embodiment of FIGS. 1 and 2, and any repetitive explanation concerning the above elements will be omitted.

Referring to FIGS. 1 and 3, the display apparatus includes a display panel 100 and a display panel driver. The display panel driver includes a controller 200, a gate driver 300, a gamma reference voltage generator 400 and a data driver 500.

According to an embodiment of the present disclosure, the controller 200 receives input image data VI, a command signal COM and an input control signal CONT from an external apparatus (not shown).

The controller 200 generates a first control signal CONT1, a second control signal CONT2, a third control signal CONT3 and a data signal DATA based on the input image data VI, the command signal COM, and the input control signal CONT.

The controller 200 includes a memory 210, a moving image determining part 220, a sensing part 230, a first dithering part 240, a second dithering part 241, a first error diffusing part 250, a second error diffusing part 251, a buffer 260, and a pattern control part 270.

According to an embodiment of the present disclosure, the memory 210 stores the input image data VI according to the command signal COM.

The moving image determining part 220 determines whether the input image data VI represent a moving image or a static image.

According to an embodiment of the present disclosure, the sensing part 230 senses a movement of the display apparatus or a movement of the user. The sensing part 230 senses at least one of the movement of the display apparatus and/or the movement of the user.

For example, the sensing part 230 includes a first sensor for sensing the movement of the display apparatus. The sensing part 230 may also include a second sensor for sensing the movement of the user. In some embodiments, the sensing part 230 may include both, the first sensor for sensing the movement of the display apparatus, and the second sensor for sensing the movement of the user. The sensing part 230 may sense a relative movement between the display apparatus and the user.

According to an embodiment of the present disclosure, when the input image data VI represents a moving image, the first dithering part 240 operates a first dithering operation to the input image data VI.

According to another embodiment of the present disclosure, when the input image data VI represents a static image and the display apparatus or the user moves, the second dithering part 241 may operate a second dithering operation to the input image data VI.

The first dithering operation may be different from the second dithering operation. The first dithering operation may be configured for dithering when the moving image is sensed. For example, a dithering degree may be determined according to a movement of an object in the moving image in the first dithering operation.

The second dithering operation may be configured for dithering when the movement of the display apparatus or the user is sensed. For example, a dithering degree may be determined according to the movement of the display apparatus or the user in the second dithering operation.

According to an embodiment of the present disclosure, when the input image data VI represents a static image and movement of the display apparatus or the user is not sensed, the dithering operation may not be applied to the input image data VI.

According to an embodiment of the present disclosure, the first error diffusing part 250 receives the image data to which the first dithering operation is applied. The first error diffusing part 250 diffuses an error due to quantization of the dithered image data to adjacent pixels so that the display quality of the display panel 100 may be further improved. In some embodiments, the first error diffusing part 250 may be omitted.

According to an embodiment of the present disclosure, the second error diffusing part 251 receives the image data to which the second dithering operation is applied. The second error diffusing part 251 diffuses an error due to quantization of the dithered image data to adjacent pixels so that the display quality of the display panel 100 may be further improved. In some embodiments, the second error diffusing part 251 may be omitted.

When the dithering operation is applied to the input image data VI, the buffer 260 receives the error-diffused image data from the first and second error diffusing parts 250 and 251. When the dithering operation is not applied to the input image data VI, the buffer 260 receives the input image data VI from the memory 210. The buffer 260 outputs output image data VO.

According to an embodiment of the present disclosure, the pattern control part 270 determines a pattern of a signal and the number of subframes according to the dithering operation. In addition, the pattern control part 270 may also determine the pattern of the signal and the number of subframes according to the dithering degree.

According to various embodiments of the present disclosure, when the input image data VI represents a moving image, the dithering operation is applied to the input image data VI. When the input image data VI represents a static image and the movement of the display apparatus or the user is sensed, the dithering operation is applied to the input image data VI. Accordingly, a display quality of the display panel 100 may be improved.

According to an embodiment of the present disclosure, when the input image data VI represents a moving image, the first dithering operation is applied to the input image data VI. When the input image data VI represents a static image and the movement of the display apparatus or the user is sensed, the second dithering operation, which is different from the first dithering operation is applied to the input image data VI. Accordingly, a display quality of the display panel 100 may be further improved.

According to an embodiment of the present disclosure, the number of the subframes of the output image data VO is controlled according to the dithering operation and the dithering degree so that power consumption of the display apparatus may be decreased.

Figure 4:
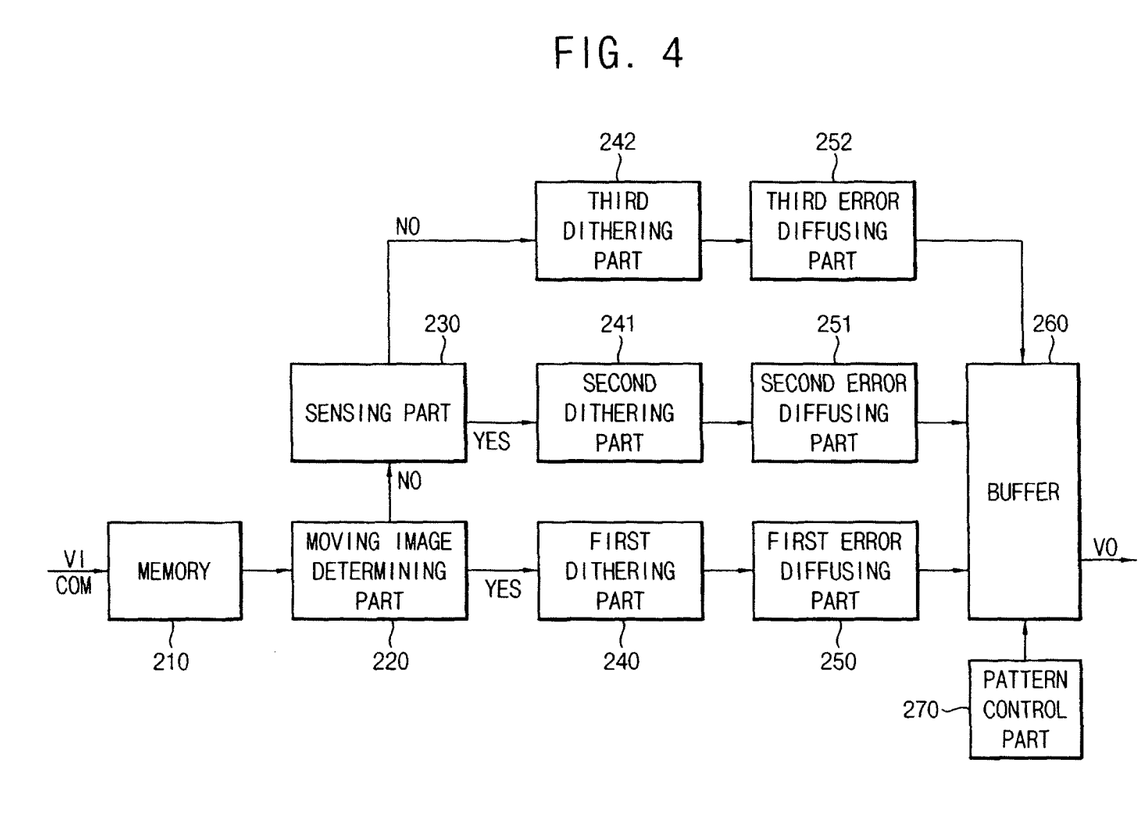
FIG. 4 is a block diagram illustrating a controller of a display apparatus according to an embodiment of the present disclosure.

FIG. 4 is a block diagram illustrating a controller of a display apparatus according to embodiments of the present disclosure.

The display apparatus according to the embodiments of FIG. 4 is substantially similar to the display apparatus of the embodiments explained with reference to FIGS. 1 and 2 except for the controller. Thus, the same reference numerals will be used to refer to the same or like parts as those described in the previous embodiment of FIGS. 1 and 2, and any repetitive explanation concerning the above elements will be omitted.

Referring to FIGS. 1 and 4, the display apparatus includes a display panel 100 and a display panel driver. The display panel driver includes a controller 200, a gate driver 300, a gamma reference voltage generator 400, and a data driver 500.

According to an embodiment of the present disclosure, the controller 200 receives input image data VI, a command signal COM and an input control signal CONT from an external apparatus.

The controller 200 generates a first control signal CONT1, a second control signal CONT2, a third control signal CONT3 and a data signal DATA based on the input image data VI, the command signal COM and the input control signal CONT.

In one embodiment, the controller 200 includes a memory 210, a moving image determining part 220, a sensing part 230, a first dithering part 240, a second dithering part 241, a third dithering part 242, a first error diffusing part 250, a second error diffusing part 251, a third error diffusing part 252, a buffer 260 and a pattern control part 270.

According to an embodiment of the present disclosure, the memory 210 stores the input image data VI according to the command signal COM.

According to an embodiment of the present disclosure, the moving image determining part 220 determines whether the input image data VI represents a moving image or a static image.

According to an embodiment of the present disclosure, the sensing part 230 senses a movement of the display apparatus or a movement of the user. The sensing part 230 senses at least one of the movement of the display apparatus, and/or the movement of the user.

For example, the sensing part 230 may include a first sensor for sensing the movement of the display apparatus. In one embodiment, the sensing part 230 includes a second sensor for sensing the movement of the user. The sensing part 230 may also include both of the first sensor for sensing the movement of the display apparatus, and the second sensor for sensing the movement of the user. The sensing part 230 may sense a relative movement between the display apparatus and the user.

In some embodiments, when the input image data VI represents a moving image, the first dithering part 240 operates a first dithering operation to the input image data VI.

According to an embodiment of the present disclosure, when the input image data VI represent the static image and the display apparatus or the user moves, the second dithering part 241 may operate a second dithering operation to the input image data VI.

The first dithering operation may be different from the second dithering operation. The first dithering operation may be configured for dithering when the moving image is sensed. The second dithering operation may be configured for dithering when the movement of the display apparatus or the user is sensed.

According to an embodiment of the present disclosure, when the input image data VI represents a static image and the movement of the display apparatus or the user is not sensed, the third dithering part 242 may operate a third dithering operation to the input image data VI.

The third dithering operation may be different from the first dithering operation and the second dithering operation. The third dithering operation may be configured for dithering when the static image is sensed. For example, a dithering degree of the third dithering operation may be relatively small such that a dithering noise or a dithering error may not be generated for the static image.

According to an embodiment of the present disclosure, the first error diffusing part 250 receives the image data to which the first dithering operation is applied. The first error diffusing part 250 diffuses an error due to quantization of the dithered image data to adjacent pixels so that the display quality of the display panel 100 may be further improved. In some embodiments, the first error diffusing part 250 may be omitted.

According to an embodiment of the present disclosure, the second error diffusing part 251 receives the image data to which the second dithering operation is applied. The second error diffusing part 251 diffuses an error due to quantization of the dithered image data to adjacent pixels so that the display quality of the display panel 100 may be further improved. In some embodiments, the second error diffusing part 251 may be omitted.

According to an embodiment of the present disclosure, the third error diffusing part 252 receives the image data to which the third dithering operation is applied. The third error diffusing part 252 diffuses an error due to quantization of the dithered image data to adjacent pixels so that the display quality of the display panel 100 may be further improved. In some embodiments, the third error diffusing part 252 may be omitted.

According to an embodiment of the present disclosure, the buffer 260 receives the error-diffused image data from the first, second and third error diffusing parts 250, 251 and 252. The buffer 260 outputs output image data VO.

According to an embodiment of the present disclosure, the pattern control part 270 determines a pattern of a signal and the number of subframes according to the dithering operation. In addition, the pattern control part 270 determines the pattern of the signal and the number of subframes according to the dithering degree.

According various embodiments of the present disclosure, when the input image data VI represents a moving image, the dithering operation is applied to the input image data VI. When the input image data VI represents a static image and the movement of the display apparatus or the user is sensed, the dithering operation is applied to the input image data VI. Thus, a display quality of the display panel 100 may be improved.

According to an embodiment of the present disclosure, when the input image data VI represents a moving image, the first dithering operation is applied to the input image data VI. When the input image data VI represents a static image and the movement of the display apparatus or the user is sensed, the second dithering operation which is different from the first dithering operation is applied to the input image data VI. When the input image data VI represents a static image and the movement of the display apparatus or the user is not sensed, the third dithering operation which is different from the first and second dithering operations is applied to the input image data VI. Accordingly, a display quality of the display panel 100 may be further improved.

In addition, power consumption of the display apparatus may be decreased by controlling the number of the subframes of the output image data VO according to the dithering operation and the dithering degree.

The various embodiments of the present disclosure may be applied to a display apparatus having a gate driver driving a plurality of gate lines of the display apparatus and a display system including the display apparatus. For example, the embodiments of the present disclosure may be applied to an organic light emitting display apparatus and/or a liquid crystal display apparatus, that may be found in, by way of example and not of limitation, a television, a computer monitor, a laptop, a digital camera, a cellular phone, a smart phone, a personal digital assistant (PDA), a portable multimedia player (PMP), a MP3 player, a navigation system, a video phone, etc.

The foregoing is illustrative of example embodiments and is not to be construed as limiting thereof. Although a few example embodiments have been described, those skilled in the art will readily appreciate that many modifications are possible to the example embodiments without materially departing from the novel teachings and aspects of the present disclosure. Accordingly, all such modifications are intended to be included within the scope of the present disclosure as defined in the claims. Therefore, it is to be understood that the foregoing is illustrative of various example embodiments and is not to be construed as being limited to the example embodiments specifically disclosed, and that modifications to the disclosed example embodiments, as well as other example embodiments, are intended to be included within the scope of the appended claims, and equivalents thereof.

What is claimed is:

1. A display panel driver comprising:
    a moving image determining part configured to determine whether input image data represents a moving image or a static image;
    a sensing part configured to sense a movement of a display apparatus or a user of the display apparatus;
    a dithering part configured to perform a dithering operation to the input image data when:
        the input image data represents the moving image, the input image data represents
        the static image and the movement of the display apparatus or the user is sensed,
    wherein the dithering part comprises a first dithering part configured to perform a first dithering operation to the input image data when the input image data represents the moving image, and a second dithering part configured to perform a second dithering operation to the input image data when the input image data represents the static image and the display apparatus or the user moves.

2. The display panel driver of claim 1, further comprising a memory configured to store the input image data,
    wherein the moving image determining part is configured to analyze the input image data stored in the memory, and
    wherein the moving image determining part is configured to analyze a command signal to access the memory to determine whether the input image data represents the moving image or the static image.

3. The display panel driver of claim 1, wherein the sensing part comprises a sensor configured to sense the movement of the display apparatus.

4. The display panel driver of claim 3, wherein the sensor is an acceleration sensor.

5. The display panel driver of claim 1, wherein the sensing part comprises a sensor configured to sense the movement of the user.

6. The display panel driver of claim 5, wherein the sensor is an infrared sensor configured to sense positions of eyeballs of the user.

7. The display panel driver of claim 1, wherein the sensing part is configured to sense a relative movement between the display apparatus and the user, and
    wherein the sensing part comprises a first sensor configured to sense the movement of the display apparatus and a second sensor configured to sense the movement of the user.

8. The display panel driver of claim 1, wherein the first dithering operation is different from the second dithering operation,
    a dithering degree of the first dithering operation is determined according to a movement of an object in the moving image, and
    a dithering degree of the second dithering operation is determined according to the movement of the display apparatus or the user.

9. The display panel driver of claim 1, further comprising an error diffusing part configured to diffuse quantization error of the dithered input image data to adjacent pixels.

10. The display panel driver of claim 1, further comprising a pattern control part,
    wherein the pattern control part is configured to control output image data to have X subframes when the dithering operation is applied to the input image data, X being a positive integer, and
    the pattern control part is configured to control the output image data to have Y subframes when the dithering operation is not applied to the input image data, Y being a positive integer different from X.

11. The display panel driver of claim 10, wherein X is greater than Y.

12. A method of driving a display panel, the method comprising:
    determining whether input image data represents a moving image or a static image;
    sensing a movement of a display apparatus or a user of the display apparatus; and
    performing a dithering operation to the input image data when:
        the input image data represents the moving image; or
        when the input image data represents the static image and the movement of the display apparatus or the user is sensed,
    wherein the performing of the dithering operation comprises:
        performing a first dithering operation to the input image data when the input image data represents the moving image; and
        performing a second dithering operation to the input image data when the input image data represents the static image and the display apparatus or the user moves.

13. The method of claim 12, further comprising storing the input image data to a memory, wherein the determining whether input image data represents the moving image or the static image comprises analyzing the input image data inputted to the memory, and analyzing a command signal to access the memory.

14. The method of claim 12, wherein the sensing the movement of the display apparatus or the user comprises sensing the movement of the display apparatus by a sensor.

15. The method of claim 14, wherein the sensor is an acceleration sensor.

16. The method of claim 12, wherein the sensing the movement of the display apparatus or the user comprises sensing the movement of the user by a sensor.

17. The method of claim 16, wherein the sensor is an infrared sensor adapted to sense positions of eyeballs of the user.

18. The method of claim 12, wherein the sensing the movement of the display apparatus or the user of the display apparatus comprises determining a relative movement between the display apparatus and the user using a first sensor sensing the movement of the display apparatus or a second sensor sensing the movement of the user.

19. A display apparatus comprising:
a display panel comprising a gate line and a data line;
a controller comprising:
  a moving image determining part configured to determine whether an input image data represents a moving image or a static image;
  a sensing part configured to sense a movement of a display apparatus or a user of the display apparatus; and
  a dithering part configured to perform a dithering operation to the input image data when:
    the input image data represents the moving image, or
    the input image data represents the static image and the movement of the display apparatus or the user is sensed, the controller configured to generate a first control signal, a second control signal and a data signal;
a gate driver configured to output a gate signal to drive the gate line based on the first control signal received from the controller; and
a data driver configured to output a data voltage to drive the data line based on the second control signal and the data signal received from the controller,
wherein the dithering part comprises a first dithering part configured to perform a first dithering operation to the input image data when the input image data represents the moving image, and a second dithering part configured to perform a second dithering operation to the input image data when the input image data represents the static image and the display apparatus or the user moves.

* * * * *